Dec. 14, 1937.  W. A. STOLLEY  2,102,492
FISH LURE
Filed Dec. 6, 1935
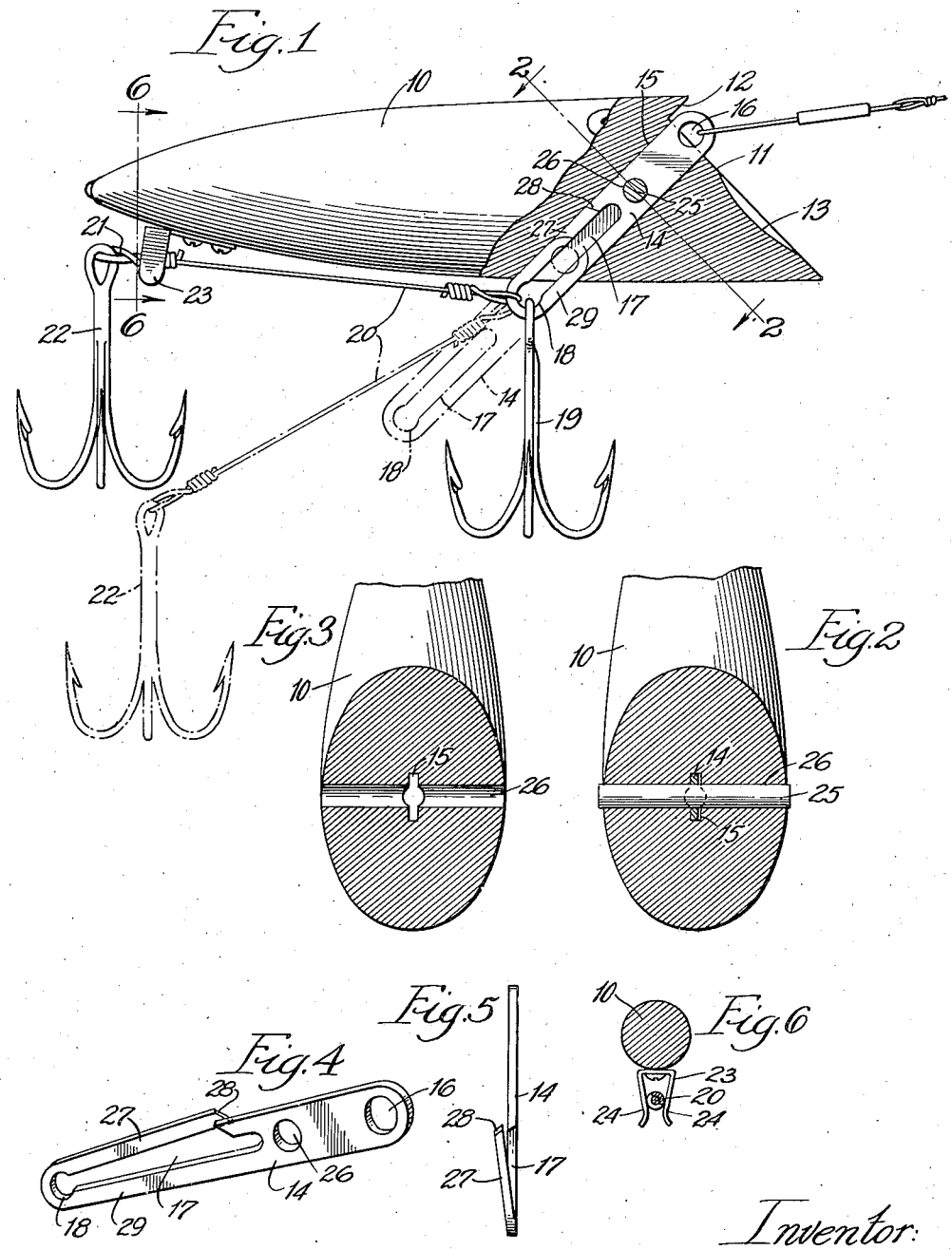
Inventor:
William A. Stolley,
By Banning & Banning
Attys.

Patented Dec. 14, 1937

2,102,492

UNITED STATES PATENT OFFICE 2,102,492

FISH LURE

William A. Stolley, Dowagiac, Mich., assignor to James Heddon's Sons, Dowagiac, Mich., a corporation of Michigan Application December 6, 1935, Serial No. 53,180

5 Claims. (Cl. 43—46)

The lure of the present invention has been designed primarily for salmon fishing, although it is in no sense limited to that particular use, but the features involved are available for use in connection with various lures designed particularly for the hooking of large powerful game fish, and where exceptional strength in the line tie and hook connections is required.

The invention is directed particularly to a combined line tie and hook fastener which is preferably made of stainless steel and is entered through the body of the lure so that the tension on the line will be transmitted entirely through the connection of the present invention, and the body itself will be relieved from strain.

The arrangement is one which not only affords a strong, simple and durable method of fastening, but also permits the hooks to be readily changed in case of breakage or where hooks of various types are required for alternate use.

Further objects and details will appear from a description of the invention in conjunction with the accompanying drawing, wherein,—

Figure 1 is a side elevation partly in section showing the features of the present invention;

Figs. 2 and 3 are cross sectional views taken on line 2—2 of Fig. 1, Fig. 2 showing the dowel pin and fastening link in position, and Fig. 3 showing these parts removed;

Fig. 4 is a perspective view of the link;

Fig. 5 is an edge elevation thereof; and

Fig. 6 is a sectional detail taken through line 6—6 of Fig. 1.

The lure comprises a body 10, preferably of wood or other buoyant light material which is tapered at its rear end and beveled at its forward end to afford an upwardly sloping front face 11 terminating at its upper end in an overhang 12. The front face 11 is provided with a dished cavity 13, and the configuration as a whole is one which tends to afford a diving and darting erratic movement due to the impingement of the water against the front face and its discharge laterally from the front face and along the sides of the lure body. The particular shape of the lure body, however, is immaterial, since the features of the present invention can be applied to plug baits of many forms and shapes.

The line tie and hook fastening is in the form of a link 14 formed from an elongated plate of stainless steel having great strength to withstand the struggles of large powerful game fishes. The link is entered through an obliquely extending slot 15 cut through the lure body at substantially right angles to the general plane of the front face. The link is provided at its upper end with an aperture 16 which furnishes the line tie connection, and is provided at its lower end with an elongated slot 17 enlarged at its lower end 18 to afford connection for a forward hook or gang 19, and also afford connection for a wire leader 20 which at its rear end is provided with a loop 21 to afford connection for a rear hook or gang 22.

While trolling or casting, the leader is held elevated in substantial parallelism with the under side of the lure body by means of a spring clip 23 having side prongs 24—24, which embrace the coil of the loop 21 so that the rear hook or gang will be held elevated in substantial trailing relation to the body of the lure until a fish is hooked, after which the pull and struggles of the fish will tend to disengage the leader from between the prongs of the clip 23, so that it will assume the position indicated in dotted lines in Fig. 1, and under the pull of the fish will tend to straighten out into alignment with the line, allowing the lure body to assume an oblique relation to the line and the attachments through which the draft is transmitted.

The link 14 is held in place within the slot 15 by means of a cross dowel pin 25 which is entered through an aperture 26 in the link located at a point slightly above the forward end of the slot 17. The slotting of the lower end of the link affords narrow side bars 29 and 27, and the latter is cut free at its upper end 28 and is normally outwardly sprung as indicated in Fig. 4.

The dowel pin 25 is removable, so that after removal the link can be slid downwardly as indicated in dotted lines, which frees the arm 28 from confinement within the slot 15 in the body, so that it will normally spring outwardly as in Fig. 4 to permit replacement of the forward hook or gang 19 and the rear hook or gang 22 with its leader 20, as occasion may require. Upon replacement of the new hooks, the link can be shoved upwardly to its position within the slot 15 in the body, during which operation the free arm 28 will be sprung inwardly to alignment with the remainder of the link and thus confined within the slot 15, which is sufficiently narrow to afford a close confinement for the link. The length of the link is sufficient to afford a slight protrustion of its upper and lower ends beyond the lure body to afford the line tie and the hook connection.

The arrangement is one which affords great strength and rigidity, and completely relieves the body of the lure from strain, so that adequate strength will be afforded at all times irrespective of the construction of the body or the material from which it is composed. Furthermore, the release afforded for the rear gang enables the body to swing free from proximity to the mouth of the fish, so that there will be less likelihood of the body becoming torn or broken during the struggles incident to the hooking and landing of a powerful fish.

I claim:

1. In a fish lure, the combination of a body provided with a slot therethrough, a link entered through said slot and configured at its upper end to afford a line tie and configured at its lower end to afford a hook connection, a leader connected to the lower end of the link, a hook connected to the rear end of the leader, a clip on the rear portion of the body adapted to normally engage and hold the leader and hook elevated in contiguous relation to the body and adapted to permit disengagement of the leader and hook to swing free of the body, and a cross pin entered transversely through the link and through the adjacent portion of the body.

2. In a fish lure, the combination of a body, a slot extending through the body, a link slidably entered through said slot and configured at its upper end to afford a line tie and provided in its lower portion with an elongated slot affording a hook connection at its lower end, one of the arms of the slotted portion of the link being disconnected from the body of the link at one end and adapted when the link is withdrawn from the slot in the body to project laterally from the plane of the link to provide for the insertion of a hook and adapted, when the link is normally positioned within the slot in the body, to be held closed within the plane of the link, releasable means for normally holding the link within the slot, and a hook secured to the lower end of the link.

3. In a fish lure, the combination of a body, a slot extending through the body, a link configured at its upper end to afford a line tie and provided in its lower portion with an elongated slot affording a hook connection at its lower end, one of the arms of the slotted portion of the link being disconnected from the body of the link at one end and adapted when the link is withdrawn from the slot in the body to project laterally from the plane of the link to provide for the insertion of a hook, a forward hook secured to the lower end of the link, a leader secured to the rear end of the link, a rear hook secured to the leader, and means on the body for normally releasably holding the leader and the rear hook in contiguous relation to the body.

4. In a fish lure, the combination of a body, a slot extending through the body, a link configured at its upper end to afford a line tie and provided in its lower portion with an elongated slot affording a hook connection at its lower end, one of the arms of the slotted portion of the link being disconnected from the body of the link at one end and adapted when the link is withdrawn from the slot in the body to project laterally from the plane of the link to provide for the insertion of a hook, and adapted, when the link is normally positioned within the slot in the body, to be held closed within the plane of the link, a forward hook secured to the lower end of the link, a leader secured to the lower end of the link, a rear hook secured to the leader, and means on the body for normally releasably holding the leader and the rear hook in contiguous relation to the body.

5. In a fish lure, the combination of a body tapered in its rear portion and provided with a front face extending downwardly and forwardly in oblique relation to the longitudinal axis of the body, the body being provided with a slot extending obliquely rearwardly and downwardly from the front face and through the bottom of the body, a link entered through the slot in the body and protruding at each end therefrom, the upper end of the link being apertured to afford a line tie and the lower portion of the link being provided with an elongated slot affording contiguous side arms, one of which is cut free at its upper end from the body of the link and adapted, when the link is held within the slot, to be maintained in closed relation to the body of the link, and adapted, when the lower end of the link is drawn away from the slot, to be outwardly sprung to permit a hook to be entered within the slot in the link, a removable dowel pin entered transversely through the link and through the body, a forward hook secured to the lower end of the link, a leader secured to the lower end of the link, a rear hook secured to the rear end of the leader, and a clip on the body for normally releasably holding the leader and the rear hook in suspended contiguous relation to the body.

WILLIAM A. STOLLEY.